(12) United States Patent
Burga et al.

(10) Patent No.: US 6,216,529 B1
(45) Date of Patent: Apr. 17, 2001

(54) GLIDE HEAD WITH TAPERED TRAILING END

(75) Inventors: Margelus A. Burga, San Jose; Alexander A. Burga, Santa Clara, both of CA (US)

(73) Assignee: Marburg Technology, Inc., San Jose, CA (US)

( * ) Notice: Subject to any disclaimer, the term of this patent is extended or adjusted under 35 U.S.C. 154(b) by 0 days.

(21) Appl. No.: 09/333,835

(22) Filed: Jun. 15, 1999

(51) Int. Cl.[7] ...................................................... G01B 5/28
(52) U.S. Cl. .............................................. 73/105; 360/103
(58) Field of Search ...................... 73/104, 105; 360/103, 360/104, 122

(56) References Cited

U.S. PATENT DOCUMENTS

| | | | |
|---|---|---|---|
| 3,678,482 | * 7/1972 | Billawala | 360/103 |
| 5,299,079 | * 3/1994 | Kuroda | 360/103 |
| 5,359,480 | * 10/1994 | Nepela et al. | 360/103 |
| 5,513,056 | * 4/1996 | Kawasaki et al. | 360/103 |
| 5,636,086 | * 6/1997 | Bolasna et al. | 360/103 |
| 5,817,931 | * 10/1998 | Boutaghou | 73/105 |
| 5,939,624 | 8/1999 | Smith, Jr. | 73/105 |
| 5,963,396 | * 10/1999 | Burga et al. | 360/103 |
| 5,973,891 | * 10/1999 | Neumann | 360/122 |
| 6,021,666 | * 2/2000 | Yao et al. | 73/105 |

FOREIGN PATENT DOCUMENTS

689198A2 * 12/1995 (EP) .

* cited by examiner

*Primary Examiner*—Hezron Williams
*Assistant Examiner*—Michael Cygan
(74) *Attorney, Agent, or Firm*—Skjerven Morrill MacPherson LLP; Michael J. Halbert

(57) ABSTRACT

A glide head with at least one rail includes a tapered trailing end on the at least one rail. The glide head flies with a pitch angle over the surface of the disk, thus, by tapering the trailing ends of the rails of the slider, the lowest flying point of the glide head is the junction of the air bearing surface of the rails and the trailing end taper. Because the junction of the air bearing surface and the tapered trailing end is the closest point on the glide head to the surface of the disk, the point of contact on the glide head is moved forward from the trailing end of the glide head. The tapered trailing end advantageously increases the amount of material surrounding the lowest flying point of the glide head relative to conventional glide heads. Consequently, the glide head with the tapered trailing end wears slower than conventional glide heads, and thus has an increased life. Further, the glide head with a tapered trailing end flies at a lower fly height than conventional glide heads.

19 Claims, 7 Drawing Sheets

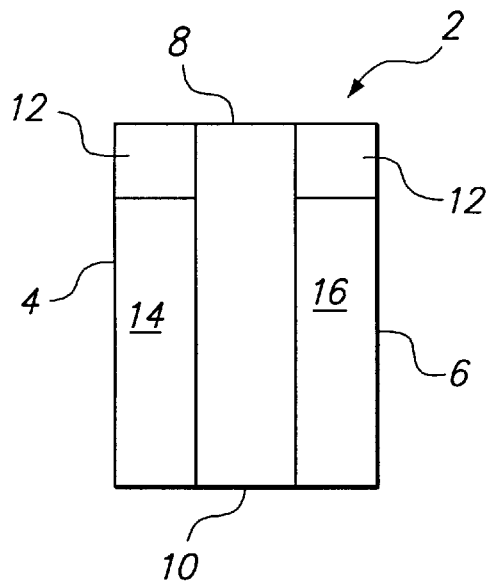
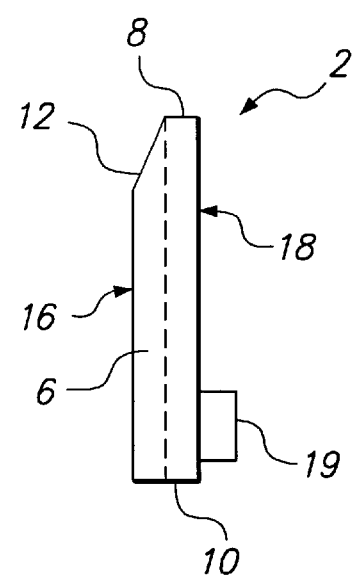
FIG. 1A (PRIOR ART)  FIG. 1B (PRIOR ART)
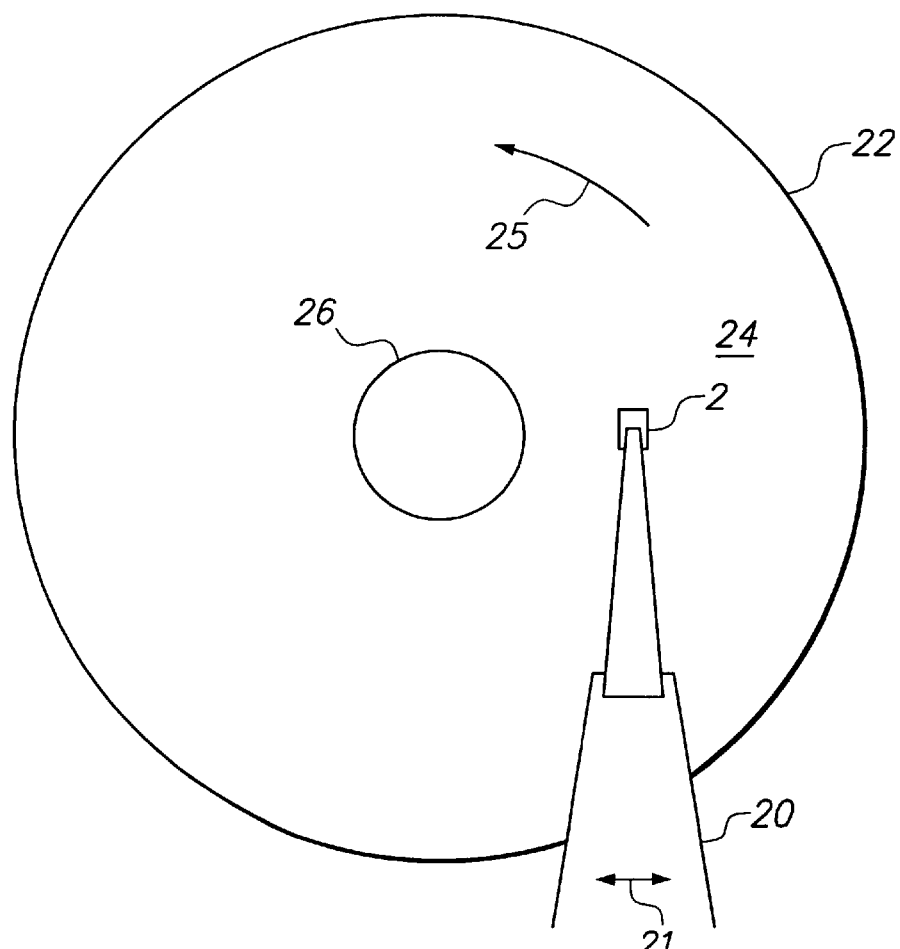
FIG. 2 (PRIOR ART)

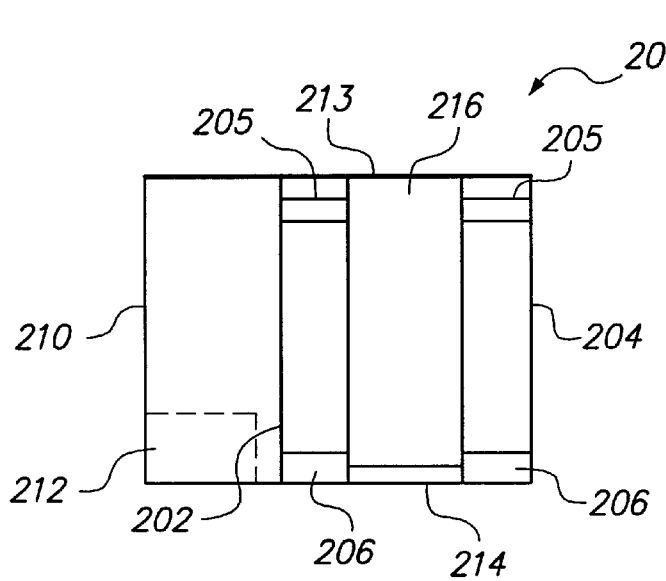
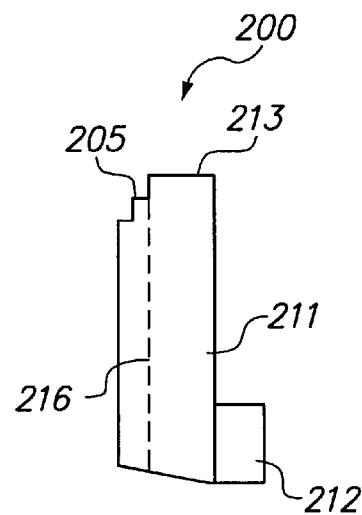
FIG. 12A  FIG. 12B
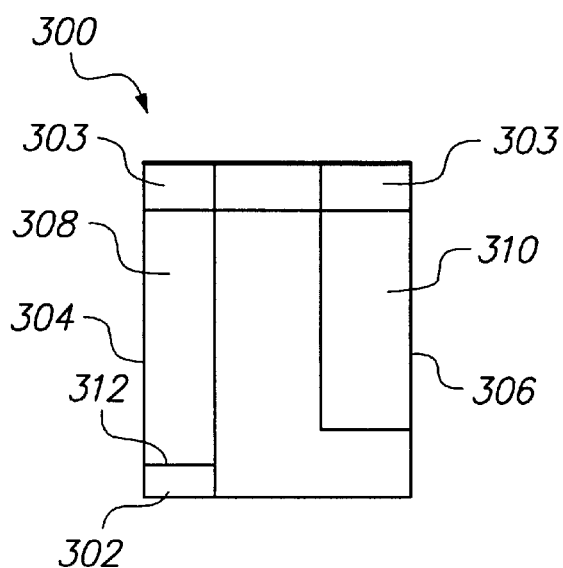
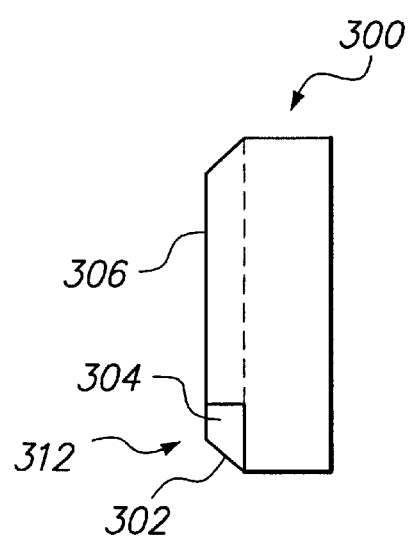
FIG. 13A  FIG. 13B

GLIDE HEAD WITH TAPERED TRAILING END

FIELD OF THE INVENTION

The present invention relates to glide heads used to detect defects on the surface of magnetic or magneto-optical memory media.

BACKGROUND

Read/write heads, such as that used in disk drives, fly close to the surface of a magnetic or magneto-optical disk and read or write data on the surface of the disk. The closer the read/write head flies to the surface of the disk, the more information that may be written on the disk, i.e., the information density is increased. Currently, the typical separation between a read/write head and the surface of the disk is approximately 1μ" (microinch). While it is desirable for a read/write head to fly as close as possible to the surface of the disk, it is important that the read/write head does not contact the disk or defects on the disk. A defect on the surface of the disk that physically contacts the read/write head may damage the read/write head, the disk, or both. Thus, care must be taken to assure that there are no defects on the surface of the disk that are greater than the fly height of the read/write head such that the defect may contact the read/write head.

Glide heads are used to test the surface of disks for defects that are large enough to contact a read/write head during use. FIGS. 1A and 1B illustrate a respective bottom plan view and side view of a conventional glide head 2. Glide head 2 has a leading end 8 and a trailing end 10. Two side rails 4 and 6 extend from the leading end 8 to the trailing end 10. Glide head 2 includes taper 12 at the leading end 8 of side rails 4 and 6. Taper 12 permits air to be forced under air bearing surfaces 14 and 16 to provide lift to glide head 2 as it flies over a disk. A transducer 19, such as a piezoelectric crystal, is mounted on the top surface 18 of glide head 2 and is used to convert energy from an impact between the glide head 2 and a defect on a disk being tested into an electrical signal.

FIG. 2 illustrates glide head 2 mounted on a suspension arm 20 and flying over the surface 24 of a rotating disk 22. Disk 22 rotates in the direction of arrow 25 about a spindle 26. A linear actuator (not shown) controls the radial position of glide head 2 with respect to disk 22 by moving suspension arm 20 as illustrated by arrow 21.

It should be understood that typically, a top surface 24A and a bottom surface 24B of disk 22 is tested at the same time by a downward facing glide head 2A and an upward facing glide head 2B, respectively, as shown in the side view illustrated in FIG. 3. Glide heads 2A and 2B are mounted on respective suspension arms 20A and 20B, which are controlled by linear actuator 28.

During a test, disk 22 rotates to produce a high linear velocity between disk 22 and glide head 2. The high linear velocity drives air between the surface 24 of disk 22 and glide head 2, which produces lift on air bearing surfaces 14 and 16 of glide head 2. Thus, glide head 2 is said to "fly" over surface 24 of disk 22. As disk 22 rotates, glide head 2 is moved laterally over a radius of disk 22 by linear actuator 28 (shown in FIG. 3). The lateral movement of glide head 2 is slow relative to the rotation of disk 22.

Glide head 2 detects a defect on surface 24 of disk 22 by physically contacting the defect. When glide head 2 impacts a defect, mechanical energy is generated in the form of a vibration. The mechanical energy is transferred through glide head 2 and is received by a transducer 19 that is mounted on glide head 2. The transducer converts the mechanical energy into an electric signal, which can be measured by the glide testing apparatus to determine the size of the defect.

The magnitude of the electric signal generated by transducer 19 is determined by the strength of the impact between glide head 2 and the defect, i.e., the greater the impact, the more mechanical energy generated and the greater the magnitude of the electric signal produced by transducer 19. Consequently, by holding glide head 2 at a constant fly height over surface 24 of disk 22, the relative size of defects that are encountered can be determined by examining the magnitude of the electric signal produced by transducer 19. When a defect is smaller than the fly height of the glide head 2, the defect will not be detected. Thus, the fly height of the glide head 2, i.e., the distance between the surface 24 of disk 22 and the lowest flying point on glide head 2, should be no greater than the height of the smallest defect to be detected, which is the same as the desired fly height of the read/write head to be used with disk 22.

During use, glide head 2 vibrates even when it does not strike a defect. This causes transducer 19 to produce an output voltage noise signal.

It is important for glide head 2 to maintain a constant fly height. To maintain a constant fly height, the rotation or angular velocity of disk 22 is automatically adjusted as glide head 2 moves laterally across the radius of disk 22. In other words, disk 22 will automatically rotate faster when glide head 2 is at an inside diameter than when glide head 2 is at an outside diameter. Thus, as glide head 2 moves across disk 22, glide head 2 will encounter a constant linear velocity, which will provide a constant fly height. Examples of glide testers that strictly control the fly height of glide heads over disks are model numbers MC 950 and MG 250 by Phase Metrics Inc., and model number 6800-50D produced by Hitachi, Inc.

Prior to being used to test magnetic or magneto-optical disks for defects, each glide head is individually calibrated to ensure that it will fly at the desired fly height, i.e., no greater than the height of the smallest defect to be detected. Calibration of the fly height of the glide head is typically performed on a dedicated fly height tester, such as the Phase Metrics DFHT manufactured by Phase Metrics, Inc. located in Fremont, Calif. Calibration of the fly height of a glide head determines the appropriate linear velocity to use with that particular glide head to produce the desired fly height. The glide testing apparatus then uses that appropriate linear velocity with that particular glide head.

In addition, the output signal of the glide head is calibrated to ensure that an unacceptably large defect will properly register. Calibration of the output signal may be accomplished with a dedicated calibration disk that has calibration bumps of a known size. When the glide head contacts one of the calibration bumps, the output signal can be adjusted so that it will be detectable during testing. Thus, for a defect of a specific size the glide head is calibrated to produce an output signal of a specific magnitude. By way of an example, glide head 2 may be calibrated to produce an output signal of 4 volts when glide head 2 contacts a 1μ" defect.

Unfortunately, conventional glide heads wear out from testing disks for defects. With use, a conventional glide head will produce progressively smaller output signals when detecting defects of the same size. Consequently, while a glide head may be calibrated initially to produce a large output signal when detecting a defect, eventually the output signal of the glide head will be too small to register or below the background noise of the system when detecting a defect of the same size. It has been found that a conventional glide head has a useful life of approximately fifty disks before the output signal becomes lost in the background noise.

Once the useful life of a conventional glide head is over, that glide head must be replaced. The worn out glide head is no longer useful and is discarded. Replacing a glide head requires calibration and installation of a new glide head. Consequently, a significant cost, including time and labor, is associated with discarding worn glide heads and calibrating and installing new glide heads.

Thus, there is a need for a glide head that has a longer useful life.

SUMMARY

A glide head in accordance with the present invention includes at least one rail with a tapered trailing end. The glide head flies with a pitch angle causing the junction of the air bearing surface and the tapered trailing end of the rail to be the closest point on the glide head to the surface of a disk being tested, i.e., the lowest flying point. In one embodiment the taper angle is greater than the pitch angle. The tapered trailing end advantageously increases the amount of material surrounding the lowest flying point of the glide head relative to conventional glide heads. Consequently, a glide head with the tapered trailing end wears slower than conventional glide heads, and thus has an increased useful life.

Moreover, a glide head with a tapered trailing end has a lower fly height and is less sensitive to changes in linear velocity than conventional glide heads.

The glide head may have two or more rails with tapered trailing ends. In another embodiment, the glide head may have a long rail with a tapered trailing end and a relatively short rail that does not have a tapered trailing end. The junction of the air bearing surface and the tapered trailing end of the long rail extends further towards the trailing end of the glide head than the trailing end of the short rail. Thus, the lowest flying point on the glide head is the junction of the air bearing surface and the tapered trailing end of the long rail. The glide head may include other elements such as an extension of the top surface of the glide head upon which a transducer is mounted.

BRIEF DESCRIPTION OF THE DRAWINGS

The above and other features, aspects, and advantages of the present invention will become better understood with regard to the following description, appended claims, and accompanying figures, where:

FIGS. 1A and 1B illustrate a respective bottom plan view and side view of a conventional glide head;

FIG. 2 illustrates a glide head mounted on a suspension arm and flying over the surface of a rotating disk;

FIGS. 12A and 12B show a bottom plan view and side view, respectively, of a glide head in accordance with another embodiment of the present invention; and FIGS. 13A and 13B show a bottom plan view and side view, respectively, of a glide head in accordance with another embodiment of the present invention.

DETAILED DESCRIPTION

Figure 3:
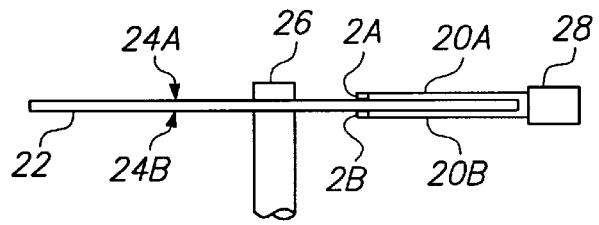
FIG. 3 illustrates a side view of a downward facing glide head and an upward facing glide head testing the top and bottom surfaces, respectively, of a disk.
Figure 4A:
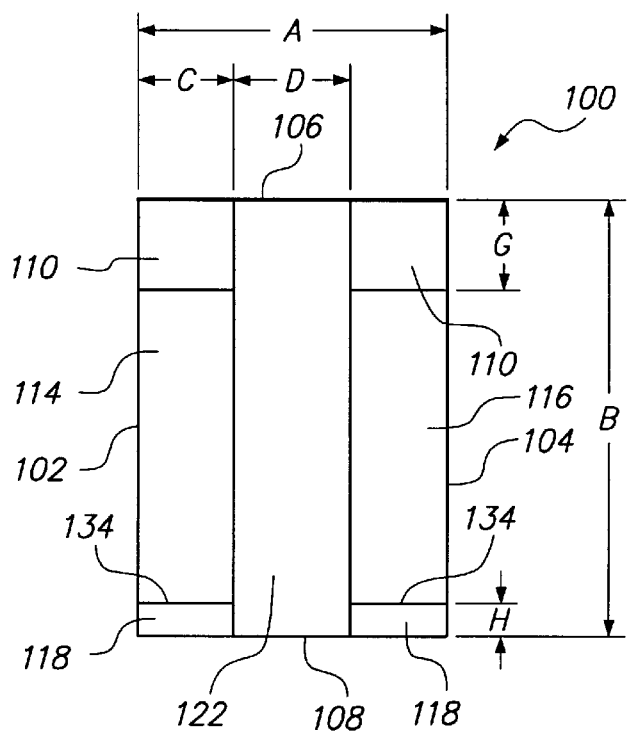
FIGS. 4A and 4B show a bottom plan view and side view, respectively, of a glide head having rails with tapered trailing ends in accordance with an embodiment of the present invention.
Figure 4B:
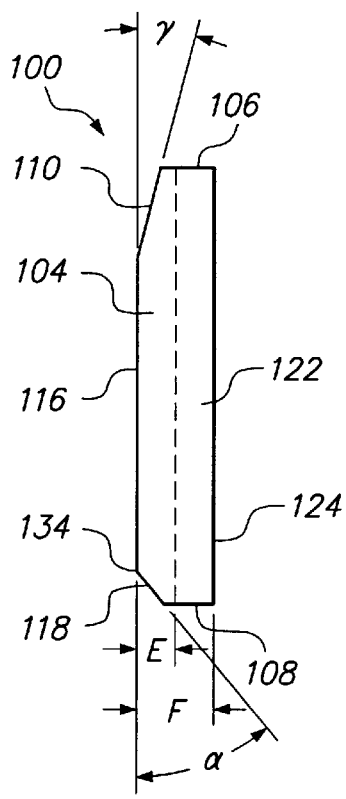

FIGS. 4A and 4B show a bottom plan view and side view, respectively, of a glide head 100 having side rails with tapered trailing ends in accordance with an embodiment of the present invention. The trailing end taper used in glide head 100 advantageously increases the useful testing life of glide head 100.

As shown in FIG. 4A, glide head 100 includes first and second rails 102 and 104 that run from the leading end 106 to the trailing end 108 of glide head 100 with a recessed area 122 formed between the two rails 102 and 104. Rails 102 and 104 include a leading end taper 110 and a trailing end taper 118 with air bearing surfaces 114 and 116 disposed between. As will be discussed in more detail below in reference to FIG. 5, glide head 100 flies with a pitch angle with the trailing end 108 closer to the surface of a disk than the leading end 106. Due to the pitch angle during flight and because glide head 100 includes trailing end taper 118, the lowest flying point 134 on glide head 100 is moved forward of the trailing end 108, and is at the junction of the air bearing surfaces 114, 116 with trailing end taper 118.

FIG. 4B shows a side view of glide head 100, including rail 104 (rail 102 is hidden from view in FIG. 4B) and the angles of leading end taper 110 and trailing end taper 118. Recessed area 122 is indicated by a broken line.

Glide head 100 is a 50% slider. The term "50%," as is well known in the art, refers to the size of the slider. It should be understood, however, that glide head 100 is not limited to a 50% slider, but may be any size desired. As a 50% slider, glide head 100 is approximately 0.058 inches in width (distance A in FIG. 4A), 0.078 inches in length from leading end 106 to trailing end 108 (distance B). Rails 102 and 104 are approximately 0.012 inches wide (distance C) and are separated by 0.034 inches (distance D), which defines area 122. Rails 102 and 104 extend approximately 0.004 inches from area 122 (distance E in FIG. 4B). Air bearing surfaces 114, 116 of rails 102, 104 is approximately 0.024 inches from the top surface 124 of glide head 100 (distance F in FIG. 4B).

Leading end taper 110 has an approximately 1 degree angle (angle $\gamma$ in FIG. 4B) with respect to air bearing surfaces 114 and 116, and a length of approximately 0.009 (distance G in FIG. 4A). Trailing end taper 118 has an approximately 2.5 degree angle (angle α in FIG. 4B) with respect to air bearing surfaces 114 and 116 and is approximately 0.003 inches (distance H in FIG. 4A).

Glide head 100 is machined using standard manufacturing methods out of a wafer of aluminum oxide-titanium carbide, such as material type no. 310, available from 3M Corporation located in Minnesota. Leading end taper 110 and trailing end taper 118 are produced with conventional grinding or ion milling. Care must be taken to ensure that trailing end taper 118 has the same length H on rails 102 and 104, because unequal lengths of trailing end taper 118 on rails 102 and 104 will cause the lowest flying point 134 on each rail to be in a different location, which may degrade the performance of glide head 100. The use of a relatively sharp trailing end taper angle α, e.g., approximately 2.5 degrees plus or minus 10 minutes, facilitates control of the length H of trailing end taper 118.

One method of manufacturing glide head 100 is to slice a wafer into rows of the desired length of glide head 100. The rows are then individually bonded onto a transfer apparatus, which holds slice of wafer during further processing. The rails 102, 104 are then defined into the slice of the wafer by ion milling or grinding. The relief, i.e., area 122, between the rails are also defined. The individual glide heads are then cut while still bonded to the transfer apparatus. The leading end taper 110 is then defined by placing the air bearing surfaces 114, 116 of the glide head level on a polishing machine and then setting the desired angle for the leading end taper 110, e.g., 50 minutes. The leading end taper 110 is then formed by grinding. The trailing end taper 118 is formed in a similar manner, by leveling the air bearing surfaces 114, 116 to the surface of the polishing machine and then setting the desired trailing end taper 118, e.g., 2.5 degrees and polishing the trailing end taper 118 to the desired size. The individual glide heads are then debonded from the transfer apparatus, cleaned and inspected.

In addition, if desired, the surface of glide head 100 may be coated, before or after forming the rails and/or tapered ends, with carbide or other hard material by sputtering or other similar well-known techniques to further increase the durability of glide head 100.

Figure 5:
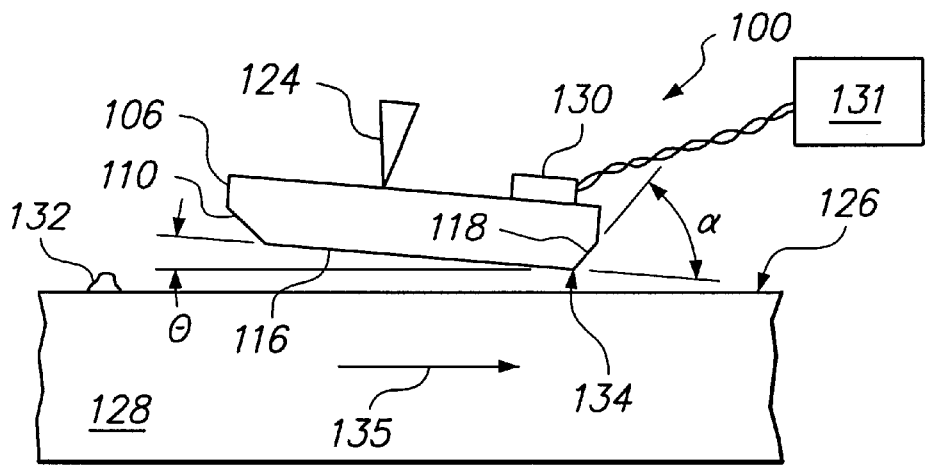
FIG. 5 shows a side view of the glide head of FIGS. 4A and 4B mounted on a suspension arm and flying over the surface of a disk.

FIG. 5 shows a side view of glide head 100 mounted on a suspension arm 124 flying over the surface 126 of a disk 128. An appropriate suspension arm is a type 2, 4, 13, 18.50 or 19 model available from Magnecom, Inc. located in San Diego, Calif. A typical gram force applied on glide head 100 toward the surface 126 of disk 128 can be approximately 2, 3.5, 6, 9.5, or 15 grams, or any other gram force desired, depending on the type of disk being tested.

Glide head 100 is shown in FIG. 5 with a greatly exaggerated trailing end taper 118 angle α. Mounted on glide head 100 is a transducer 130, such as a piezoelectric crystal, which receives the mechanical energy generated when glide head 100 contacts an asperity, such as defect 132. An appropriate piezoelectric crystal should be of good quality such as that available from Secor, Ltd. located in the United Kingdom. The mechanical energy generated from an impact with a defect is transferred through glide head 100 until the mechanical energy is received by transducer 130 and converted into an electrical output signal. The output signal from transducer 130 on glide head 100 is received by the glide testing apparatus 131. Glide testing apparatus 131 may be, for example, model numbers MC 950 or MG 250 by Phase Metrics Inc., or model number 6800-50D produced by Hitachi, Inc.

As shown in FIG. 5, disk 128 moves under glide head 100 in the direction of arrow 135. As disk 128 rotates beneath glide head 100, glide head 100 is supported above surface 126 by a hydrodynamic lifting force of air beneath air bearing surfaces 114 and 116 (air bearing surface 114 is hidden from view in FIG. 5). Leading end taper 110 provides a faster takeoff when disk 128 begins to rotate by permitting air to flow under air bearing surfaces 114, 116. Leading end taper 110 also increase the hydrodynamic lifting force at leading end 106, which causes leading end 106 to fly higher above surface 126 than trailing end 108.

Due to the increased hydrodynamic lifting force at leading end 106, glide head 100 flies over surface 126 with a pitch angle Θ, which is shown greatly exaggerated in FIG. 5. The pitch angle Θ of glide head 100 is approximately 0.02 degrees or less, and is typically 0.008 degrees. The pitch angle Θ may be controlled, e.g., by altering the location that suspension arm 124 is mounted to glide head 100. Because glide head 100 flies with a pitch angle Θ, the trailing end 108 of glide head 100 is closer to surface 126 than the leading end 106.

Because rails 102 and 104 have a trailing end taper 118, the lowest flying point 134 on glide head is moved forward of trailing end 108. The lowest flying point 134 on glide head 100 is at the junction of trailing end taper 118 and air bearing surfaces 114 and 116. In one embodiment, trailing end taper angel α is as close to pitch angle Θ as possible, while ensuring that both rails 102 and 104 have the same distance H of trailing end taper 118, as discussed above.

Because the lowest flying point 134 on glide head 100 is the closest point to the surface 126 of disk 128, the lowest flying point 134 contacts more defects than any other point on glide head 100. Thus, the lowest flying point 134 serves as the primary contact point between glide head 100 and defects.

Figure 6:
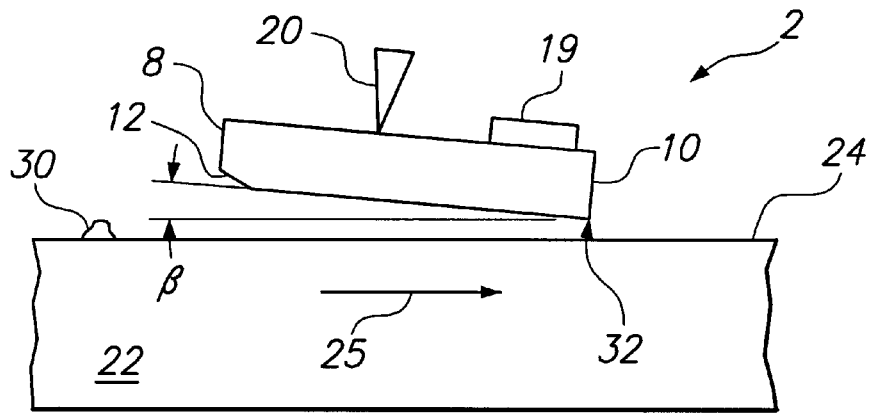
FIG. 6 shows a side view of the conventional glide head of FIGS. 1A and 1B mounted on a suspension arm and flying over the surface of a disk.

By way of comparison, FIG. 6 shows a side view of conventional glide head 2 (FIGS. 1A, 1B, and 2) mounted on suspension arm 20 and flying over the surface 24 of disk 22. Disk 22 rotates in the direction of arrow 25. As shown in FIG. 6, conventional glide head 2 with leading end taper 12 flies over the surface 24 of disk 22 with a pitch angle β. Because the leading end 8 of glide head 2 flies higher than the trailing end 10, the lowest flying point 32 on glide head 2 is the corner of the rails and the trailing end 14. Any asperity, such as defect 30, detected by glide head 2 will contact the corner of trailing end 14 of glide head 2.

As shown in FIG. 6, the corner at the trailing end 10 and the rails of conventional glide head 2, which is the lowest flying point 32, an angle of approximately ninety degrees. Thus, the lowest flying point 32 on conventional glide head 2 has little material to resist wear caused by contact with defects. Further, as glide head 2 is taking off and landing on disk 22, the lowest flying point 32 will remain in contact with the surface 24 of disk 22 longer than any other part of glide head 2. Consequently, as conventional glide head 2 is used to test disks for defects, the trailing end of the rails, i.e., lowest flying point 32, quickly wears away from contact with defects and the surfaces of the disks.

As the lowest flying point 32 of glide head 2 wears away, the amount of mechanical energy generated from impact between glide head 2 and a defect will be decreased. Thus, transducer 19 receives a decreased amount of mechanical energy, and as a result transducer 19 produces a smaller output signal. Consequently, as glide head 2 is used, the output signal generated by glide head 2 will quickly degrade.

Figure 7:
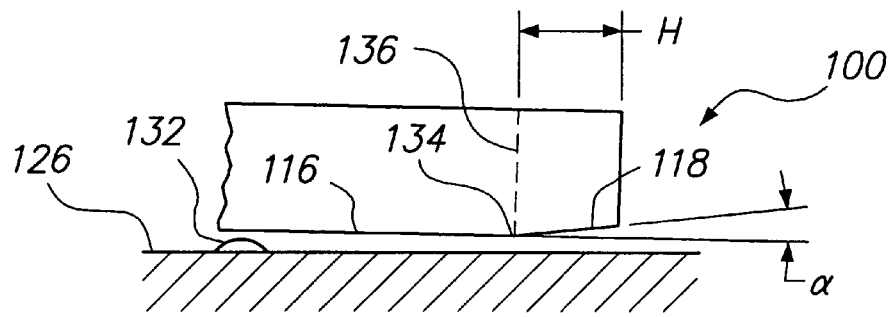
FIG. 7 shows an enlarged side view of a portion of the glide head of FIGS. 4A and 4B over the surface of a disk.

However, as shown in FIG. 5, glide head 100 has a trailing end taper 118, which advantageously increases the amount of material surrounding the lowest flying point 134. The additional material slows the wearing down of the lowest flying point 134. FIG. 7 shows an enlarged side view of a portion of glide head 100 over surface 126 with defect 132. Trailing end taper 118 and air bearing surface 116 meet to form the lowest flying point 134 of glide head 100. As can be seen in FIG. 7, the lowest flying point 134 is an obtuse angle. The additional material at the lowest flying point 134 may be visualized as the length H of trailing end taper 118. While a conventional glide head has a configuration illustrated by broken line 136, i.e., a lowest flying point formed by a ninety degree angle, glide head 100 in accordance with an embodiment of the present invention, includes the additional material to the right of broken line 136 so that the lowest flying point 134 is an obtuse angle.

Because lowest flying point 134 on glide head 100 formed by an obtuse angle (with additional material in front of and behind it), the wear of the lowest flying point 134 will be relatively slow in comparison to conventional glide head 2. Thus, the degradation of output signal of glide head 100 is reduced.

Figure 8:
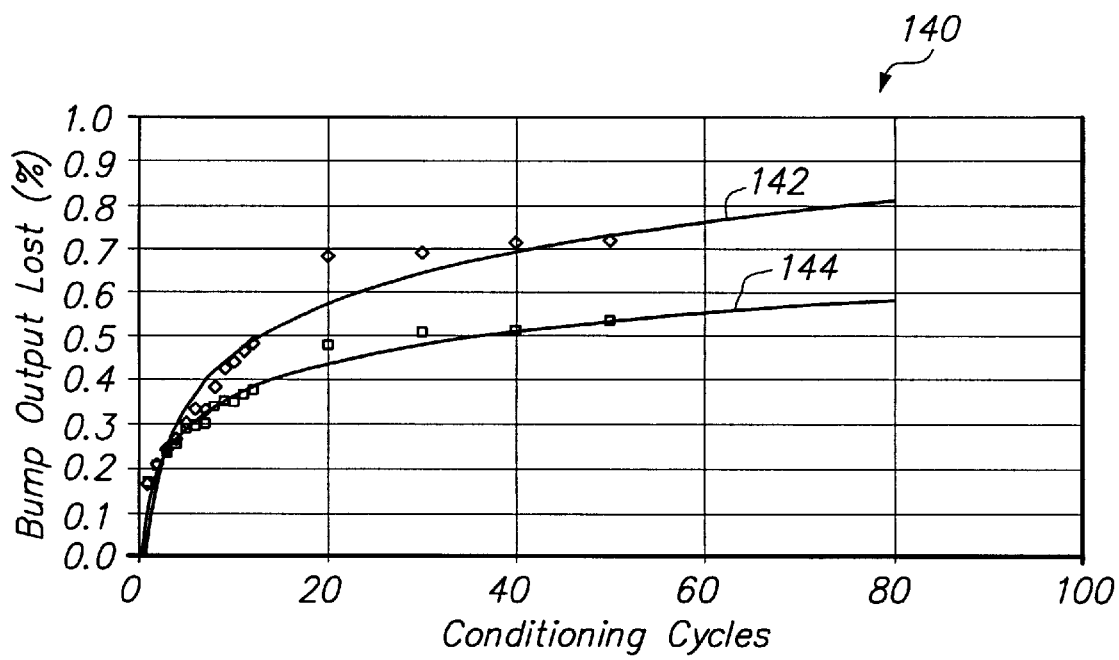
FIG. 8 is a graph showing the results of degradation tests performed on a conventional glide head and a tapered trailing end glide head.

FIG. 8 is a graph 140 showing the results of degradation tests performed on conventional glide heads and tapered trailing end glide heads. The conditions for the tests performed on the conventional glide head and the tapered trailing end glide head are identical, i.e., both types of glide heads use the same suspension force, use the same bonding point for the suspension, and use the same rail thickness. Each data point in graph 140 represents an averaging of the results for 20 glide heads for the first 12 cycles, and an averaging of the results from 10 glide heads after the first 12 cycles.

The X axis on graph 140 represents the number of conditioning cycles, i.e., the number of times that the glide head is used, and the Y axis represents the percentage of decrease in the output signal generated when the glide head contacts a bump of uniform size. Thus, the point 0.0 on the Y axis represents the initial calibrated output signal for the glide head and the point 0.5 on the Y axis represents a loss of 50 percent from the initial calibrated output signal. Curve 142 represents the results for conventional glide heads and curve 144 represents the results for tapered trailing end glide heads. As can be seen in graph 140, initially both the conventional glide head and the tapered trailing end glide head have approximately the same rate of degradation in their output signals. However, the degradation of the tapered trailing end glide head, as illustrated by curve 144, begins to decrease much quicker than the degradation of the conventional glide head. Thus, as shown in FIG. 8, the conventional glide head has lost approximately 50 percent of its output signal by the cycle 12, while the tapered trailing end glide head does not lose 50 percent of its output signal until approximately cycle 38.

Figure 9:
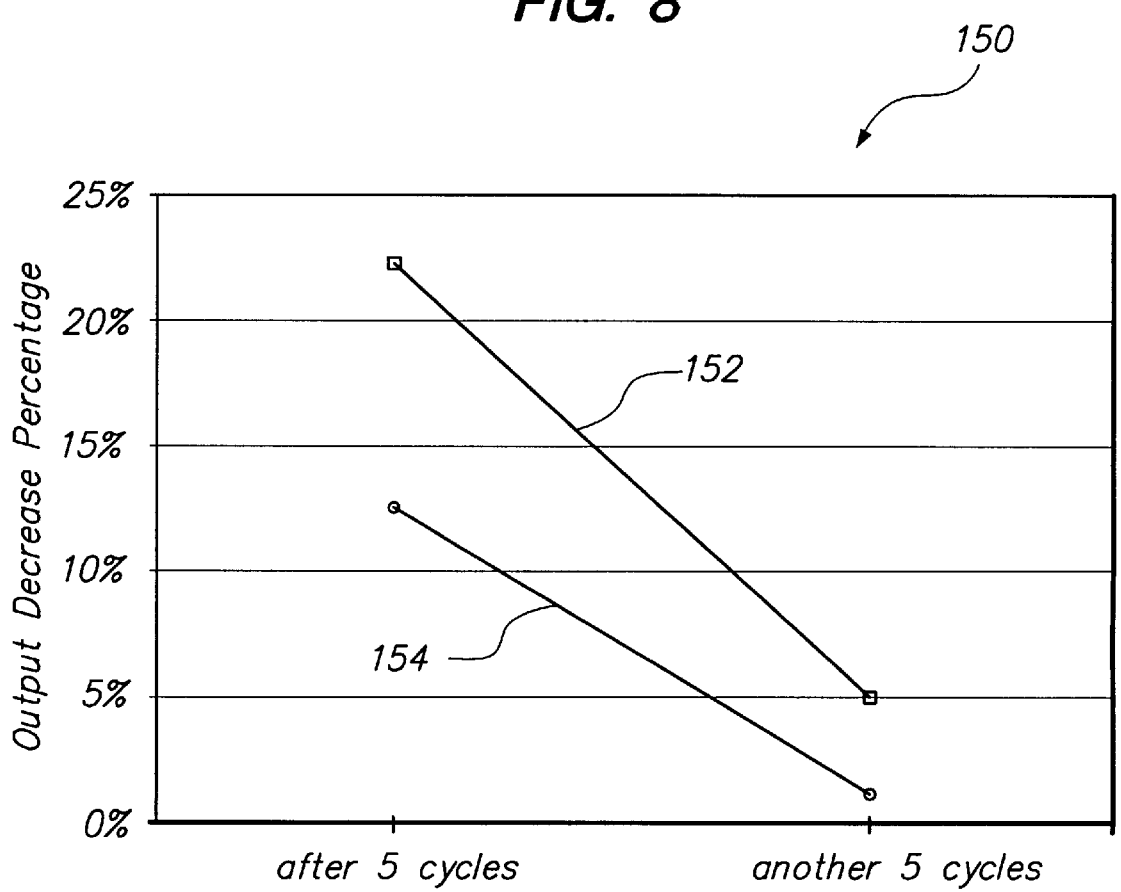
FIG. 9 is a graph showing the degradation of the output signals from a conventional glide head versus a tapered trailing end glide head over 10 cycles.

FIG. 9 is a graph 150 showing the degradation of the output signals from a conventional glide head (line 152) versus a tapered trailing end glide head (line 154) over 10 cycles, where each data point represents the averaging of the results of glide heads. As can be seen in graph 150, after 5 cycles, the conventional glide head (line 152) has lost 22 percent of its output signal, while the tapered trailing end glide head (line 154) has lost only 12 percent. After another 5 cycles, the conventional glide head (line 152) has lost another 5 percent of its performance, while the tapered trailing end glide head (line 154) has lost only approximately 2 percent.

Another advantage of the present invention is that the trailing end taper 118 on glide head 100, shown in FIGS. 4A and 4B, is held closer to the surface of the disk than the trailed end of conventional glide heads. It is believed that this is caused by Bernoulli's effect. The air that flows over air bearing surfaces 114, 116 accelerates once it flows over trailing end taper 118. Thus, there is a decrease in upward pressure at the trailing end taper 118 and, consequently, the trailing end taper 118 is held closer to the surface of the disk than the trailing end of a conventional glide head.

Figure 10:
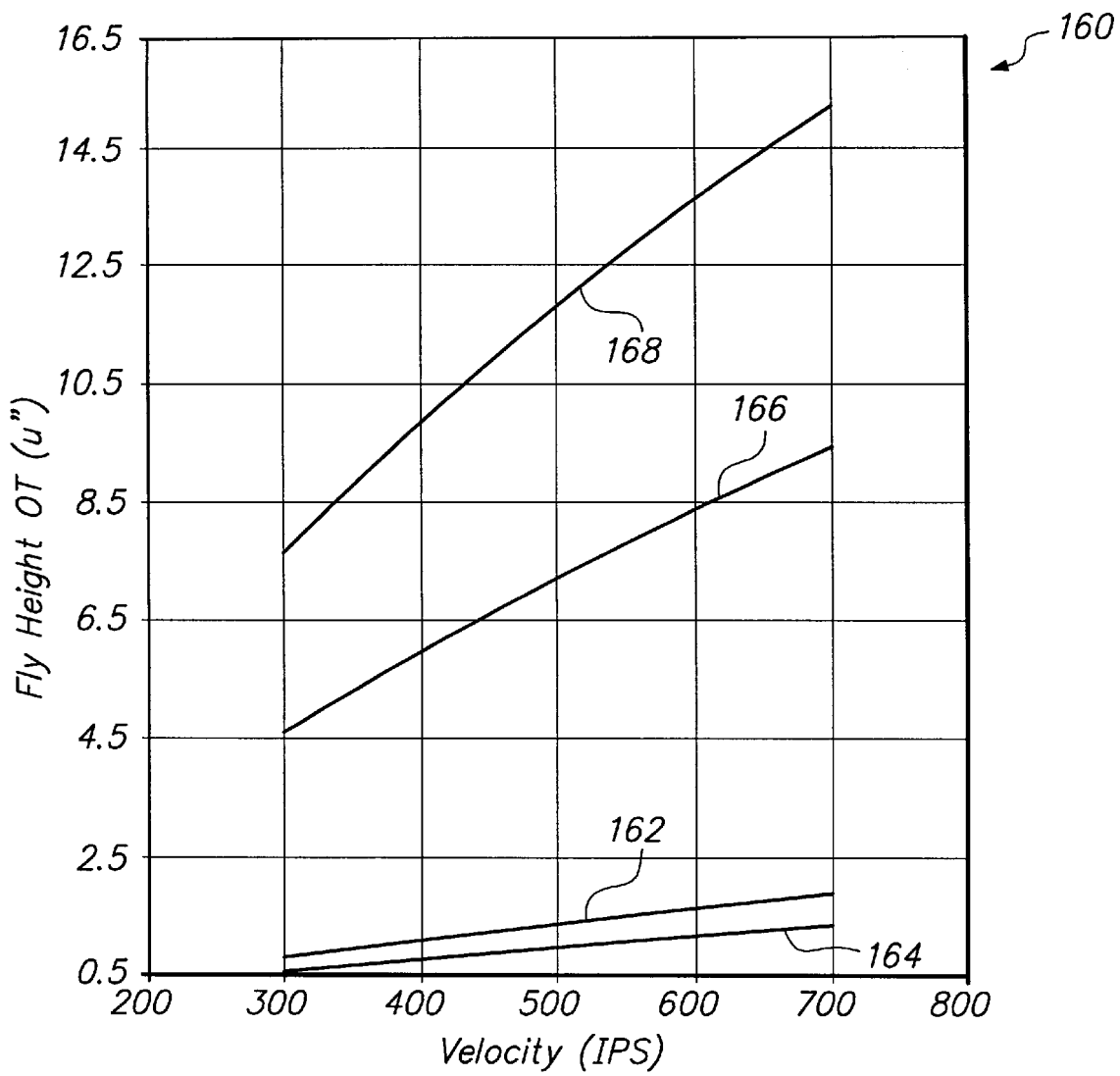
FIG. 10 is a graph showing the results of fly height tests performed on conventional glide heads and tapered trailing end glide heads.

FIG. 10 is a graph 160 showing the results of fly height tests performed on conventional glide heads and tapered trailing end glide heads. Both types of glide heads used were 50% heads with 10 mil (thousandths of an inch) rails and a 9.5 gram fixture positioned at the same location on both types of heads. The X axis of FIG. 10 represents the linear velocity of the glide head relative to the disk in inches per second, and the Y axis represents the fly height of the glide heads in $\mu$". The conventional glide heads are represented by line 162 and the tapered trailing end glide heads are represented by line 164. As can be seen in FIG. 10, the trailing end of the tapered trailing end glide head (line 164) flies lower than the trailing end of a conventional glide head (line 162). Moreover, as the linear velocity is increased, the conventional glide head (line 162) increases at a faster rate than the tapered trailing end glide head (line 164). Thus, the fly height of the tapered trailing end glide head can be more accurately controlled than a conventional glide head.

FIG. 10 also shows the pitch of the conventional glide head (line 166) and the tapered trailing end glide head (line 168), where pitch is defined as the difference between the fly height at the leading end and the fly height at the trailing end. As shown in FIG. 10, the pitch of the tapered trailing end glide head (line 168) is much greater than the pitch of the conventional glide head (line 166). Further, the pitch of the tapered trailing end glide head is more sensitive to changes in linear velocity than conventional glide heads, but the fly height of the tapered trailing end glide head is lower than the fly height of a conventional glide head.

Figure 11:
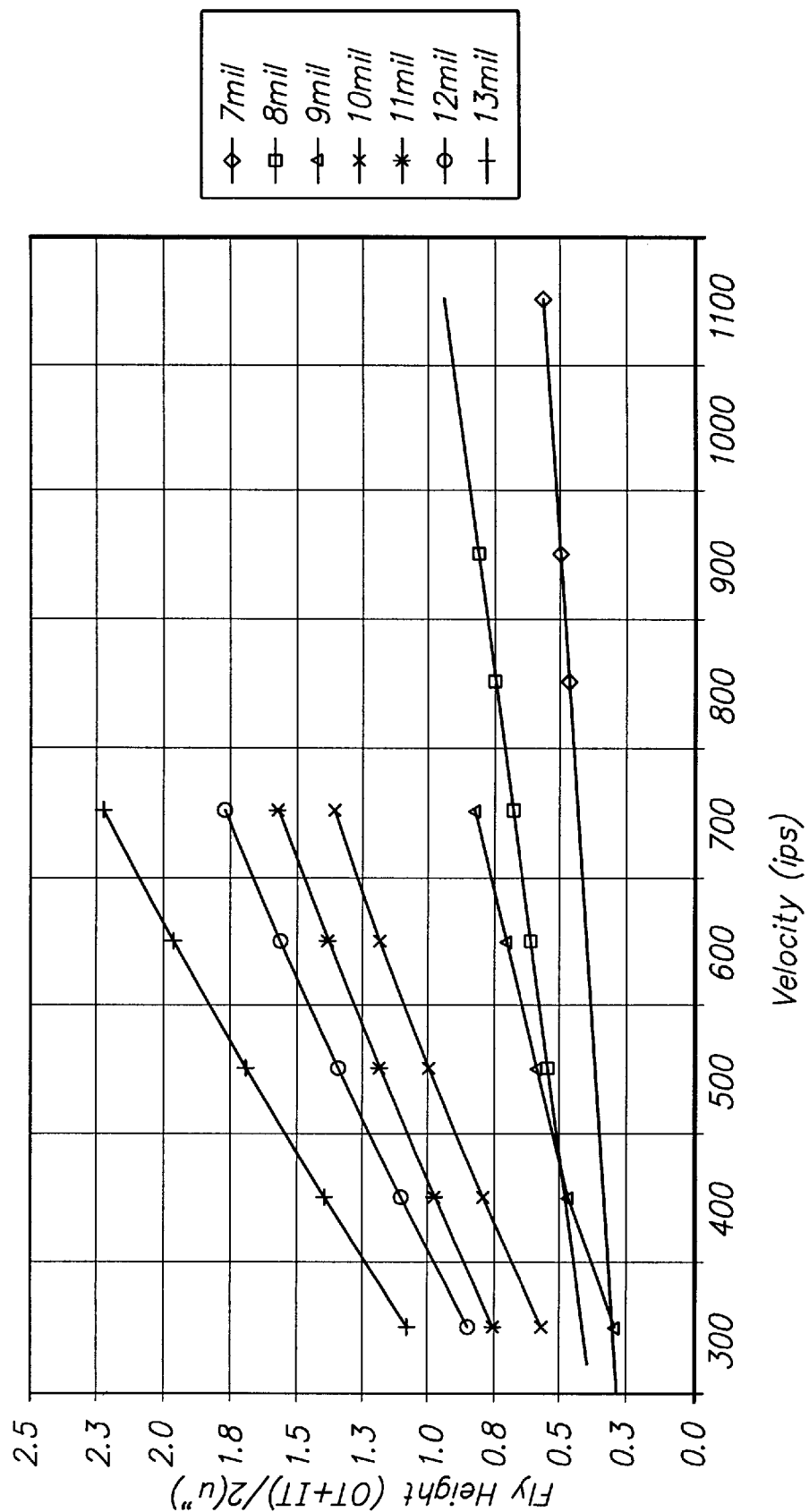
FIG. 11 is a graph showing the fly height performance of tapered trailing end glide heads having rails of differing thicknesses.

FIG. 11 is a graph 170 showing the performance of tapered trailing end glide heads having rails of differing thicknesses, where the fly height is the average of the outside and inside trailing ends. As can be seen in graph 170, a glide head with narrow rails, e.g., 7 mil, is relatively insensitive to changes in the linear velocity compared to a glide head with wide rails, e.g., 13 mil.

It should be understood that configurations other than that shown in FIGS. 4A and 4B may be used in accordance with another embodiment of the present invention. For example, FIGS. 12A and 12B show a bottom plan view and side view, respectively, of a glide head 200 having a leading stepped edge 205 and trailing tapered edge 206 on rails 202 and 204. Leading stepped edge 205 provides additional lift to the leading end 213 of glide head 200 so that glide head 200 flies at a pitch angle. It should be understood that alternative ways of generating a pitch angle during flight may also be used, including biasing the angle at which the glide head is mounted on the suspension arm. Glide head 200 also includes an extension 210 of the top surface 211 of glide head 200. A transducer 212, shown by broken lines in FIG. 12A, is mounted on extension 210. Because the mechanical energy produced by contact between glide head 200 and a defect is transferred through glide head 200 as a vibration, transducer 212 may be located on extension 210 without loss of sensitivity.

In addition, as shown in FIG. 12B, trailing end taper 206 begins at the trailing end 214 of glide head 200 such that a portion of the recessed area 216 of glide head 200 is also tapered. Thus, not only may rails 206 and 208 have tapered trailing edge 206, but part of recessed area 216 may be tapered as well. The taper on recessed area 216 is a product of the formation of a sharp trailing edge taper 206 and may not affect performance of glide head 200.

Another example of a glide head in accordance with the present invention is shown in bottom plan view and side view in FIGS. 13A and 13B, respectively. As shown in FIG. 13A, glide head 300 includes a tapered trailing edge 302 of a long rail 304, while a short rail 306 has no taper on the trailing edge. Both long rail 304 and short rail 306 include a leading end taper 303. If desired, short rail 306 may include a trailing end taper (not shown) to take advantage of the Bernoulli's effect, as described above. A trailing end taper may be generated on the short rail 306, for example, by ion milling.

Short rail 306 may be wider than long rail 304 such that the air bearing surfaces 308 and 310 have approximately equal area to produce the same amount of lift, thereby preventing unintentional roll of glide head 300. Glide head 300 flies at a pitch angle Θ, which causes the trailing end of long rail 304 to be the lowest flying point on glide head 300. Thus, long rail 304 can detect smaller defects than short rail 306. Moreover, long rail 304 will generate a greater amount of mechanical energy than short rail 306 when contacting a defect of the same size. Thus, a defect physically contacting long rail 304 will produce a larger output signal than is generated when the defect contacts short rail 306. Consequently, long rail 304 is considered more sensitive to defects than short rail 306. For more information on the use of a long rail and a short rail in a glide head, see U.S. patent application Ser. No. 08/831,878, entitled "Glide Head with an Outside Active Rail," by Margelus Burga and Alexander Burga, filed Apr. 2, 1997 now U.S. Pat. No. 5,963,396 issued on Oct. 5, 1999, and having the same assignee, the contents of which are incorporated by reference herein.

Because long rail 304 will contact more defects than short rail 306, the wear on the lowest flying point 312 on long rail 304 is accelerated. Thus, the use of tapered trailing edge 302 with long rail 304 is particularly advantageous to prolong the useful life of glide head 300.

While the present invention has been described in connection with specific embodiments, one of ordinary skill in the art will recognize that various substitutions, modifications and combinations of the embodiments may be made after having reviewed the present disclosure. The specific embodiments described above are illustrative only. Various adaptations and modifications may be made without departing from the scope of the invention. For example, the material of the glide head is not limited to aluminum oxide-titanium carbide. The surface of the glide head may be coated with carbide by sputtering or other similar techniques to further increase the durability of the glide head. Different sizes and dimensions of the glide head may be used. For example, the trailing end taper 118 is not required to have an angle of 2.5 degrees, but may vary from that angle if desired. Different types of suspensions and transducers, other than piezoelectric crystals, may be used. Further, in lieu of providing a leading edge, steps may be formed in the leading end of the rails. The spirit and scope of the appended claims should not be limited to the foregoing description.

What is claimed is:

1. A glide head to detect defects on a substrate, said glide head having a leading end and a trailing end, said glide head comprising:

at least one rail having a leading end and a trailing end, and an air bearing surface disposed between, the at least one rail having a trailing end taper, wherein said trailing end taper and said air bearing surface meet at an oblique angle to define the primary contact point, said primary contact point being the lowest flying point on said glide head that contacts defects on said substrate;

a transducer mounted on said glide head, said transducer sensing when said glide head encounters a defect, said transducer converting mechanical energy from encountering said defect into an electrical signal.

2. The glide head of claim 1, wherein said at least one rail is a first rail, said glide head further comprising:

a second rail having a leading end and a trailing end and an air bearing surface disposed between, the second rail having a trailing end taper.

3. The glide head of claim 2, wherein said first rail trailing end taper and said second rail trailing end taper have approximately the same length.

4. The glide head of claim 2, wherein said leading ends and trailing ends of said first rail and said second rail extend to said leading end and said trailing end of said glide head respectively.

5. The glide head of claim 2, further comprising a top surface and an extension, said extension outwardly extending in a direction parallel to said top surface said top surface of said glide head from one of said first rail and said second rail.

6. The glide head of claim 5, wherein said transducer is mounted on said extension.

7. The glide head of claim 1, wherein said at least one rail is a first rail, said glide head further comprising a second rail having a leading end and a trailing end, wherein said first rail is longer than said second rail.

8. The glide head of claim 2, further comprising a means for producing a pitch angle on said glide head as said glide head flies over a rotating disk.

9. The glide head of claim 2, further comprising a leading end taper on said first rail and said second rail for producing a pitch angle, and wherein said trailing end taper of said first rail and said second rail defines a taper angle that is greater than said pitch angle.

10. A method of testing the surface of a disk for defects, said method comprising:

placing a glide head over said surface, said glide head comprising a slider and a transducer mounted on said slider, said slider having a trailing end and a first rail, said first rail having an air bearing surface and a tapered trailing end that define an oblique primary contact point on said glide head;

providing a relative motion between said surface and said glide head so that said glide head flies over said surface, said glide head flies over said surface with a pitch angle wherein said oblique primary contact point is the lowest flying point on said glide head that contacts defects on said surface;

monitoring an output signal from said transducer indicating when said glide head contacts defects.

11. The method of claim 10, wherein said pitch angle is less than the angle of said tapered trailing end.

12. The method of claim 10, said slider further comprising a second rail, said second rail having an air bearing surface and a tapered trailing end defining an oblique contact point.

13. The method of claim 10, said slider further comprising a second rail, said second rail having a trailing end, wherein said junction of said air bearing surfaced and said tapered trailing end of said first rail extends further in the direction of said trailing end of said slider than said trailing end of said second rail.

14. A glide head for testing a rotating disk for defects, said glide head comprising:
- a slider having a top surface, a bottom surface, a leading end and a trailing end, said slider comprising:
  - a first rail downwardly extending from said bottom surface, said first rail having a leading end and a trailing end and an air bearing surface disposed therebetween, said trailing end being tapered at a first angle that defines an oblique primary contact point at the junction of said air bearing surface and the tapered trailing end;
  - means for producing a pitch angle on said glide head as said glide head flies over said rotating disk so that said oblique primary contact point is the lowest flying point on said glide head; and
- means for determining when said slider physically contacts a defect on a rotating disk.

15. The glide head of claim 14, wherein said means for determining is a piezoelectric transducer mounted on said top surface of said slider.

16. The glide head of claim 14, wherein said slider further comprises a second rail downwardly extending from said bottom surface, said second rail having a leading end and a trailing end, said trailing end being tapered at said first angle.

17. The glide head of claim 16, wherein means for producing a pitch angle is a taper at the leading ends of said first rail and said second rail.

18. The glide head of claim 14, wherein said first angle is greater than said pitch angle.

19. The glide head of claim 14, wherein said slider further comprises a second rail downwardly extending from said bottom surface, said second rail having a leading end and a trailing end, the taper of said trailing end of said first rail extends further toward said trailing end of said slider than said trailing end of said second rail.

* * * * *